United States Patent Office 2,901,485
Patented Aug. 25, 1959

2,901,485
8-ALKOXY-6-AMINOCARBOSTYRILS

Frederick Brody, New York, N.Y., and Julian Jacob Leavitt, Somerville, N.J., assignors to American Cyanamid Company, New York, N.Y., a corporation of Maine No Drawing. Original application December 23, 1952, Serial No. 327,667, now Patent No. 2,754,293, dated July 10, 1956. Divided and this application January 26, 1954, Serial No. 406,357

6 Claims. (Cl. 260—288)

This invention relates to new intermediates for azo dyes and is a division of copending applicational Serial No. 327,667, filed December 23, 1952, now United States Letters Patent 2,754,293. More specifically the present invention relates to compounds having the structure

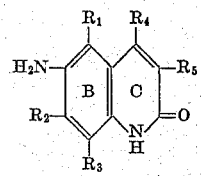

in which $R_1$ is a member of the group consisting of hydrogen, halogen, phenyl, lower alkyl and lower alkoxy radicals; $R_2$ is a member of the group consisting of hydrogen, halogen, phenyl, lower alkyl, and lower alkoxy radicals; $R_3$ is lower alkoxy; $R_4$ is a member of the group consisting of hydrogen, lower alkyl and phenyl radicals; $R_5$ is a member of the group consisting of hydrogen and lower alkyl radicals, and $R_4$ and $R_5$ together may form a cyclohexene ring.

In the past it has been difficult to find new fundamental structures which are easily varied to give a variety of shades of azo dyestuffs. Many attempts have been made to find a new class of amino compounds which are easily prepared from readily available and easily substituted intermediates which permit a substituent present and which will give a wide range of shades when coupled onto the usual coupling components. Those that have been found have many times been deficient in dyeing properties such as fastness to light or washing. Since ago dyes have been known for a long time, and since much work has been expended on new amino compounds to be used therein, it is a great contribution to the art to introduce a new class of azo dyes of surprisingly good properties.

Among the many amino compounds which have been used for azo dyes have been numerous heterocyclic compounds. We have now found that the 6-amino derivatives of the carbostyril ring system can be used to prepare azo dyes of remarkable and surprising properties. It was known that this ring system possessed a tautomeric equilibrium:

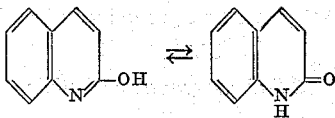

Because of this, there was no way of predicting in advance what effect this ring system would have when used in azo dyes. Some of the properties of the parent compound and its classification as a hydroxyquinoline in most textbooks might lead one to expect results analogous to the ordinary amino quinoline. We have found, however, that the properties of the dyes prepared from 6-amino-carbostyrils differ in shade from aminoquinoline dyes. We suspect, therefore, that the keto form plays a large role and therefore prefer to represent the formula as a ketone, although we do not wish to be restricted to any theory as to structure.

It is an advantage of the present invention that starting from simple and readily obtainable aromatic amines containing a wide variety of substituents, it is possible to prepare azo dyestuffs and pigments which exhibit a great variety of shades ranging from yellow to blue and which have good fastness properties to light and washing. It is another advantage of this invention that it is possible to diazotize these 6-aminocarbostyrils by the normal procedure, no special techniques being needed. It is of further advantage that the diazo compounds prepared therefrom couple readily under normal conditions, again needing no special techniques and can be used in any manner in which diazo compounds are normally used.

The 6-aminocarbostyrils can be prepared from simple aromatic amines by straightforward reactions, permitting the introduction of substituents as desired. Some of these compounds have been known a long time but have never been used before in azo dyes. The substituents which are present in the aromatic amine which is used as the starting material appear in the final carbostyril attached to the benzene ring (ring B) of the system. The amino group becomes the nitrogen of the heterocyclic ring. Substituents can be introduced into the heterocyclic ring (ring C) by the choice of the reagent used to react with the aromatic amine.

In general, the compounds of the present invention are prepared as follows: the aromatic amine is reacted with an acylacetic ester to give an acylacetarylide.

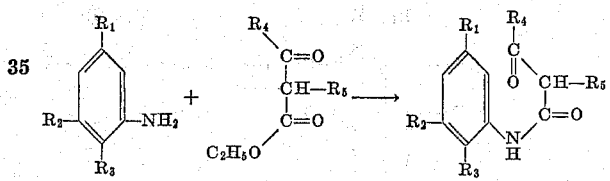

If the acylacetic ester is ethyl acetoacetate, it may be replaced by diketene

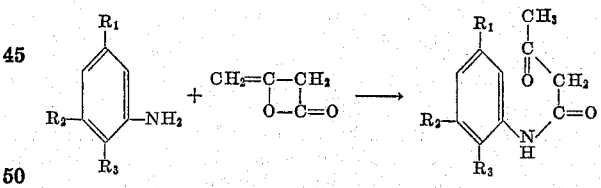

The acylacetarylides on treatment with sulfuric acid readily ring close to the 4-substituted carbostyrils in which the hydrocarbon part of the acyl group becomes the 4-substituent.

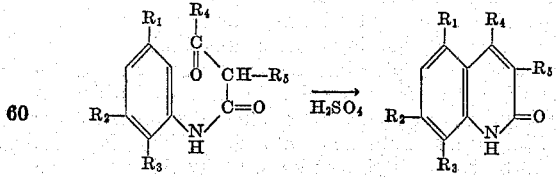

For example, a benzoylacetanilide will give a 4-phenyl-carbostyril, while a propionylacetanilide will give a 4-ethyl-carbostyril.

If an alpha-substituted acylacetic ester is used, the alpha-substituent becomes the 3-substituent ($R_5$). For example, alpha-methylacetoacetic ester will give a 3,4-dimethylcarbostyril. Similarly, alkyl groups in the 3,4-positions may be joined to form a polymethylene ring. For example, aniline with cyclohexanone 2-carboxylic ester leads after ring closure, to 3,4-tetramethylene-carbostyril:

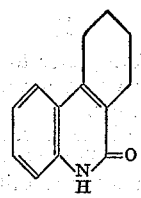

If one desires a carbostyril unsubstituted in the 4-position one may start with formylacetic ester or ethoxymethyleneacetic ester. Thus, the substituents which can be so introduced include alkyl, aryl, aralkyl, and polymethylene, and the broad scope of the invention covers, therefore, hydrocarbon radicals which may, of course, be further substituted.

Carbostyrils are known to nitrate in the 6-position, and it has been found that substituted carbostyrils containing substituents in the benzene ring do so quite readily. Thus, by starting with an aromatic amine which has the 2- and 4-positions open, it is possible to obtain the corresponding 6-amino-carbostyril from which the dyes of the present invention are prepared. The nitration of these carbostyrils can be illustrated schematically by the following equation in which the R's are hydrogen or substituents to be present in the final carbostyril as indicated:

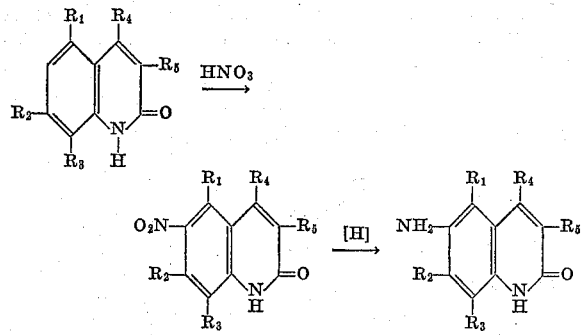

The variation of the substituents $R_4$ and $R_5$ by varying the acylacetic ester has already been indicated. To vary the substituents $R_1$, $R_2$, and $R_3$, it is merely necessary to start with a properly substituted aromatic amine. Thus, to introduce simple substituents such as alkyl, alkoxy, aralkyl, and halogen, one starts with a properly substituted aniline. To introduce an aryl group, one starts with a diphenyl derivative such as 2-phenylaniline or with another aminodiaryl such as 2-(1- or 2-naphthyl)-aniline.

In the preparation of the 6-amino-8-alkoxycarbostyrils of the present invention, the o-alkoxyanilines which may be used as the starting material include o-anisidine, 5-methyl-2-methoxyaniline, 5-ethyl-2-methoxyaniline, 2,5-dimethoxyaniline, 2,5-diethoxyaniline, o-phenetidine, 5-methyl-2-ethoxyaniline, 5-ethyl-2-ethoxyaniline, 5-phenyl-2-methoxyaniline, and the like.

Depending on the nature and position of the substituents in the final base, varying shades are obtainable when these bases are coupled into the usual coupling components. The dyes from the 6-aminocarbostyrils show a surprising depth of shade, color value, and other fastness properties, when compared with those from isomeric aminocarbostyrils. It is not known why this should be so, and we are unable to explain why dyes from 5-amino- and 7-aminocarbostyrils are nowhere nearly as good as those from the 6-aminocarbostyrils.

While a great variety of shades are obtainable in azo dyes, most of the dyes of this type have shades of yellow, orange, and red. Only a very few aromatic amines are known which give the deeper shades, such as the blues. Commercially, there are only four such "blue bases" on the market. It is, therefore, a major contribution to the art to add another type of structure to the list of amines which will give blue shades. When coupled into the usual coupling components for blue azo dyes, such as the anilides of 2-hydroxy-3-naphthoic acid, the 8-alkoxy-6-aminocarbostyrils give clear, red shades of blue which are not obtainable by the use of the usual "blue bases".

It is an advantage of the present invention that the preparation of such dyestuffs does not require special techniques but can be carried out by methods known to the art. The 6-aminocarbostyrils can all be readily diazotized, and can then be coupled with a wide variety of coupling components. For example, coupling components of the azoic type, such as arylides of acetoacetic acid or 2-hydroxy-3-naphthoic acid, form insoluble dyestuffs or pigments which can be prepared in bulk. Alternatively, the textiles can be padded with an alkaline solution of such an arylide and treated with the diazo solution to form the insoluble dyestuff on the fiber. It is also possible to convert the diazo to a diazoamino compound or other stable derivative for incorporation with a suitable coupling component in an alkaline printing paste, to be applied to goods and followed by acid development to form the dyestuff on the fiber. Among the azo color coupling components which can be used for this purpose are such compounds as beta-naphthol and derivatives such as 8-amino-2-naphthol, 8-acetylamino-2-naphthol and 4-benzoyl-1-naphthol, pyrazolones and hydroxybenzofluorenes and the various N-substituted amides such as arylides of 2-hydroxy-3-naphthoic acid, of 2-hydroxy-3-anthroic acid, of methyl and dimethyl salicylic acid, of hydroxycarbazole carboxylic acids, of hydroxybenzocarbazole carboxylic acid, of hydroxybenzacridine carboxylic acid, of hydroxydibenzofuran carboxylic acid, of hydroxydibenzothiophene carboxylic acid, of acetoacetic acid and of benzoylacetic acid and the like. The arylide group in the coupling component may be a simple aromatic group such as the radical of aniline or of an aniline derivative or of a naphthylamine or it may be the radical of a heterocyclic amine such as, for example, an amine of the benzothiazole series or of a diamine of the diphenyl sulfone series.

The 6-aminocarbostyrils may also be used for the preparation of water-soluble dyestuffs suitable for dyeing vegetable or animal fibers. In this case a great many of the customary phenolic or aminic coupling components may be used. The coupling component, however, must carry at least one sulfonic acid group in case the diazo component has none. Illustrative examples of such coupling components include salicylic acid, resorcinol, meta-phenylenediamine and a large number of naphthol sulfonic acids such as, for example, R-acid, G-acid, Cleve's acid, J-acid, gamma-acid, J-acid urea and J-acid imide, H-acid and many others. Pyrazolones such as sulfonic acid derivatives of 1-phenyl-3-methylpyrazolone-5 may also be used.

The 6-aminocarbostyrils fluoresce green-blue in ultraviolet light and may be used as intermediates in the manufacture of textile brighteners. These compounds also have anti-oxidant properties. The invention will be more fully illustrated by the following examples which are meant to be illustrative only and not by way of limitation. All parts are by weight unless otherwise specified.

EXAMPLE 1

2,5-diethoxyacetoacetanilide

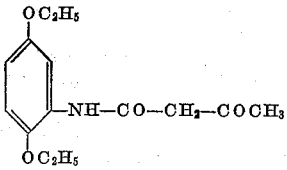

A solution 12 parts of 2,5-diethoxyaniline in 36 parts ethylacetoacetate is boiled under reflux until the condensation is complete. The reaction mixture is cooled and diluted with petroleum ether. The precipitate is then filtered and recrystallized from alcohol.

EXAMPLE 2

*5,8-diethoxy-4-methylcarbostyril*

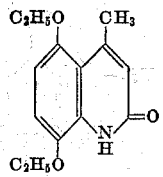

To 184 parts of concentrated sulfuric acid preheated to 85° C. is added 66.4 parts of 2,5-diethoxyacetoacetanilide gradually, keeping the temperature at 83–85° C. The dark brown solution is held at 85–90° C. until the cyclization is complete. It is then cooled and drowned in a mixture of ice and water. The resultant slurry is made basic and filtered, and the product is washed and dried. Recrystallization from aqueous alcohol gives pure 5,8-diethoxy-4-methylcarbostyril.

EXAMPLE 3

*5,8-diethoxy-4-methyl-6-nitrocarbostyril*

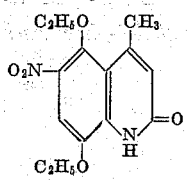

A cold solution of 5.7 parts of 5,8-diethoxy-4-methylcarbostyril in 31.5 parts of acetic acid is treated dropwise with 2.5 parts of concentrated nitric acid. The resultant slurry is drowned in cold water and filtered. The product is washed acid-free and dried, giving an excellent yield of bright greenish-yellow product.

EXAMPLE 4

*6-amino-5,8-diethoxy-4-methylcarbostyril*

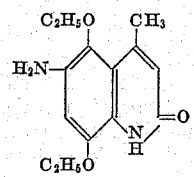

A mixture of 6.2 parts of 5,8-diethoxy-4-methyl-6-nitrocarbostyril, 197 parts of alcohol and 0.5 part of palladium-charcoal catalyst is shaken at about 45° C. under hydrogen pressure until the reduction is complete. The catalyst is filtered. The solvent is removed by evaporation and the residual amine is purified by dissolving in dilute hydrochloric acid, clarifying with charcoal, and reprecipitating with ammonia.

EXAMPLE 5

*5,8-dimethoxy-4-methyl-6-nitrocarbostyril*

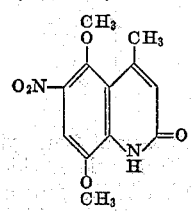

5,8-dimethoxy-4-methyl-6-nitrocarbostyril is prepared by treating a cold solution of 4.96 parts of 5,8-dimethoxy-4-methylcarbostyril in 21 parts of acetic acid with 2.1 parts of concentrated nitric acid. The yellow precipitate is filtered, washed with dilute acetic acid and then with water, and dried. The product can be purified by recrystallization from alcohol.

EXAMPLE 6

*6-amino-5,8-dimethoxy-4-methylcarbostyril*

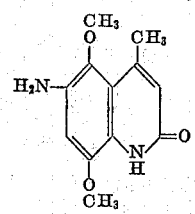

A slurry of 7.9 parts of 5,8-dimethoxy-4-methyl-6-nitrocarbostyril in 119 parts alcohol is hydrogenated at room temperature under pressure using palladium-charcoal catalyst. The catalyst is filtered off and the solution is evaporated to dryness at reduced pressure in a stream of nitrogen. The residue is dissolved in chloroform and the hydrochloride of the product precipitated in excellent yield by passing in dry hydrogen chloride gas.

EXAMPLE 7

*4,5-dimethyl-8-methoxy-6-nitrocarbostyril*

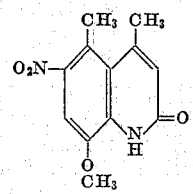

A slurry of 50 parts of 4,5-dimethyl-8-methoxycarbostyril in 525 parts acetic acid and 30 parts 96% nitric acid is stirred and heated on the steam bath until the reaction is complete. The clear red solution is cooled and drowned in water, giving an excellent yield of yellow product which may be further purified by recrystallization from alcohol.

EXAMPLE 8

*6-amino-4,5-dimethyl-8-methoxycarbostyril*

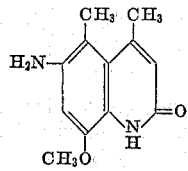

A slurry of 3.44 parts of 4,5-dimethyl-8-methoxy-6-nitrocarbostyril in 120 parts alcohol is shaken with palladium-charcoal catalyst under hydrogen pressure with gentle warming. The greenish slurry is filtered and the product is separated from the catalyst by dissolving in dilute hydrochloric acid, clarifying and reprecipitating with ammonia. A small additional amount of amine is obtained by evaporation of the alcoholic filtrate to dryness. Recrystallization from isopropyl alcohol gives greenish-yellow needles of the pure amine.

EXAMPLE 9

*8-chloro-4-methyl-6-nitrocarbostyril*

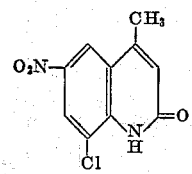

A solution of 11.95 parts of 8-chloro-4-methylcarbostyril in 52.5 parts of acetic acid and 6.0 parts of 96% nitric acid is boiled under reflux until nitration is complete. It is then cooled and filtered and the product is washed. A good yield of pale yellow product is obtained. Recrystallization from acetic acid gives the pure nitro compound in white needles.

EXAMPLE 10

*6-amino-8-chloro-4-methylcarbostyril*

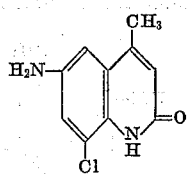

A slurry of 7.38 parts of 8-chloro-4-methyl-6-nitrocarbostyril in 120 parts alcohol is hydrogenated over palladium-charcoal catalyst at room temperature. It is then worked up as in Example 8. The product is purified by recrystallization from dichlorobenzene.

EXAMPLE 11

*5-chloro-8-methoxy-4-methyl-6-nitrocarbostyril*

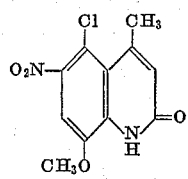

To a hot solution of 26.8 parts of 5-chloro-8-methoxy-4-methylcarbostyril in 157.5 parts acetic acid is added 11.25 parts of 95% nitric acid. The mixture is stirred and heated on the steam bath until nitration is complete. It is then allowed to cool and filtered. The product is washed acid-free with water, giving a good yield of bright yellow product which can be recrystallized from acetic acid.

EXAMPLE 12

*6-amino-8-methoxy-4-methylcarbostyril*

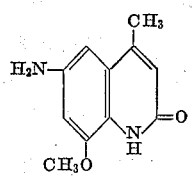

A slurry of 8.06 parts of 5-chloro-8-methoxy-4-methyl-6-nitrocarbostyril in 52.5 parts of acetic acid is treated with a solution of 27 parts stannous chloride dihydrate in 41 parts of concentrated hydrochloric acid. The mixture spontaneously heats to the boiling point. After cooling, it is drowned in a mixture of 145 parts of 50% sodium hydroxide and 200 parts of ice. The resultant slurry is filtered, washed alkali-free with water and dried, giving an excellent yield of greenish-yellow product which can be recrystallized from alcohol. Elementary analysis shows the complete absence of chlorine and gives figures for carbon, hydrogen and nitrogen in agreement with the assigned structure.

EXAMPLE 13

*6-nitro-4-phenylcarbostyril*

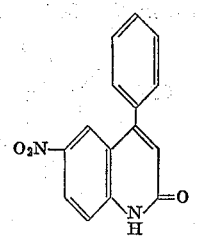

A solution of 8.0 parts of 4-phenylcarbostyril in 157.5 parts of acetic acid and 12.0 parts 96% nitric acid is stirred at reflux until nitration is complete. On cooling, the mixture deposits a satisfactory yield of faintly yellow nitro compound.

EXAMPLE 14

*6-amino-4-phenylcarbostyril*

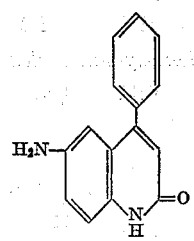

A mixture of 3.7 parts of 6-nitro-4-phenylcarbostyril, 0.5 part of palladium-charcoal catalyst, and 200 parts alcohol is shaken under hydrogen pressure at about 60° C. until the reaction is complete. The catalyst is filtered and the yellow-green solution is evaporated to dryness in vacuo. The bright yellow crystalline residue is dissolved in dilute hydrochloric acid. The solution is clarified with diatomaceous earth and reprecipitated with dilute ammonia, giving an excellent yield of product, which may be crystallized from monochlorobenzene.

EXAMPLE 15

*4-methyl-8-phenylcarbostyril*

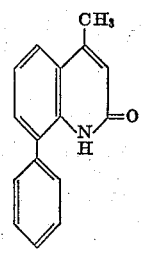

A solution of 20 parts of 2-phenyl-acetoacetanilide in 110 parts of concentrated sulfuric acid is allowed to stand at room temperature until the ring closure is substantially complete. The solution is drowned in 1000 parts water and basified with about 150 parts 50% sodium hydroxide. The product is filtered and washed. The filter cake is slurried in 300 parts water and 30 parts 20% aqueous sodium hydroxide and stirred overnight. The product is filtered, washed, and dried at room temperature in vacuo, giving a clear, sticky, pale amber glass which slowly crystallizes on standing, turning to a hard white solid which can be recrystallized from aqueous alcohol.

EXAMPLE 16

*4-methyl-6-nitro-8-phenylcarbostyril*

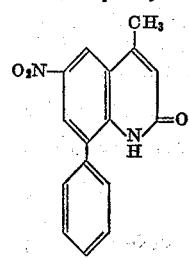

A solution of 20.0 parts of 4-methyl-8-phenylcarbostyril in 184 parts of sulfuric acid is chilled to 0–5° C. and treated with a solution of 7.5 parts of 96% nitric acid in 37 parts concentrated sulfuric acid, holding the temperature at about 5° C. by external cooling. The solution is stirred to room temperature and drowned in water, giving a yellow solid consisting of 4-methyl-6-nitro-8-phenylcarbostyril and 6,X-dinitro-4-methyl-8-phenylcarbostyril, which are separated by fractional crystallization from acetic acid.

EXAMPLE 17

*6-amino-4-methyl-8-phenylcarbostyril*

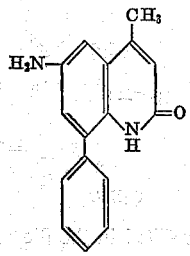

A mixture of 8.3 parts of 4-methyl-6-nitro-8-phenylcarbostyril and 0.5 part of palladium-charcoal catalyst in 80 parts of alcohol is shaken under hydrogen pressure at 40–50° C. until the reaction is complete. After cooling to room temperature, the slurry is filtered. The amine is separated from the catalyst by dissolving in dilute acid, clarifying and reprecipitating with dilute ammonia. The greenish-yellow product can be purified by recrystallization from monochlorobenzene.

EXAMPLE 18

*Alpha-benzoyl-2,5-diethoxyacetanilide*

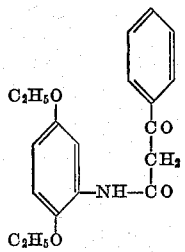

A mixture of 8.1 parts of 2,5-diethoxyaniline, 12.9 parts of ethyl benzoylacetate, 83 parts of monochlorobenzene, and 1.5 parts of diethanolamine is refluxed until condensation is complete. The crude product is precipitated with petroleum ether and recrystallized from alcohol to give a satisfactory yield of white needles.

EXAMPLE 19

*5,8-diethoxy-4-phenylcarbostyril*

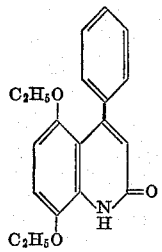

A mixture of 1.0 parts of alpha-benzoyl-2,5-diethoxyacetanilide, 1.0 part of para-toluenesulfonic acid monohydrate, and 26.5 parts of benzene is boiled under reflux until cyclization is complete. The benzene is removed by steam distillation and the product filtered from the residual aqueous slurry. It may be recrystallized from butanol.

EXAMPLE 20

*5,8-diethoxy-6-nitro-4-phenylcarbostyril*

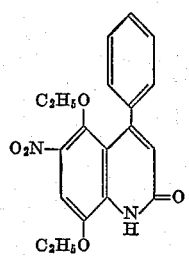

To a solution of 8.1 parts of 5,8-diethoxy-4-phenylcarbostyril in 26.3 parts of acetic acid is added 3 parts of concentrated nitric acid with stirring and cooling. The mixture is stirred to room temperature and an excellent yield of yellow solid is filtered off; the product may be crystallized from dioxane.

EXAMPLE 21

*6-amino-5,8-diethoxy-4-phenylcarbostyril*

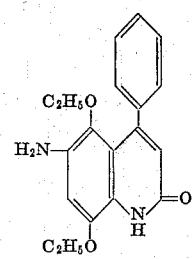

A mixture of 1.77 parts of 5,8-diethoxy-6-nitro-4-phenylcarbostyril, 0.5 part of palladium-charcoal catalyst, and 160 parts alcohol is shaken under hydrogen pressure until the reaction is complete. The catalyst is filtered off and the filtrate concentrated until the product crystallizes out in excellent yield. Recrystallization from butanol gives bright yellow needles of pure amine.

The azo dyes derived from these compounds are described and claimed in copending application Serial No. 327,667, filed December 23, 1952, now U.S. Patent No. 2,754,293.

The 6-amino-7,8-benzo-4-methylcarbostyrils and the azo dyes derived therefrom are described and claimed in our copending application, Serial No. 406,358, filed January 26, 1954, now abandoned.

We claim:

1. New compounds of the formula:

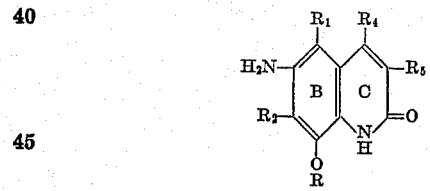

in which R is a lower alkyl group, $R_1$ is a member of the group consisting of hydrogen, halogen, phenyl, lower alkyl and lower alkoxy radicals; $R_2$ is a member of the group consisting of hydrogen, halogen, phenyl, lower alkyl, and lower alkoxy radicals; $R_4$ is a member of the group consisting of hydrogen, lower alkyl and phenyl radicals; $R_5$ is a member of the group consisting of hydrogen and lower alkyl radicals, and $R_4$ and $R_5$ together may form a cyclohexene ring.

2. The new compound of the formula:

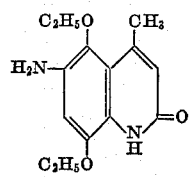

3. The new compound of the formula:

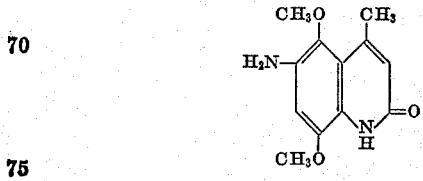

4. The new compound of the formula:
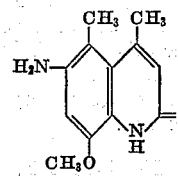
5. The new compound of the formula:
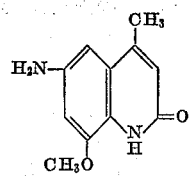
6. A new compound of the formula:
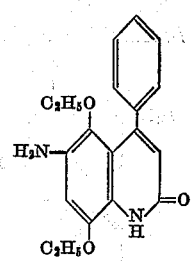
References Cited in the file of this patent
Mislow et al.: J. Am. Chem. Soc., vol. 68, pp. 1553–6 (1946).
Monti et al.: Gazz. Chim. Ital., vol. 69, pp. 745–9 (1939), as cited in Chem. Abstracts, vol. 34 (1940).